US005359655A

United States Patent [19]

Rademaker et al.

[11] Patent Number: 5,359,655
[45] Date of Patent: Oct. 25, 1994

[54] SUPPLY CIRCUIT FOR A TELECOMMUNICATION LINE, PROVIDING HIGHLY SYMMETRICAL AND RAPID RESPONSE TO LINE VOLTAGE DISTURBANCES

[75] Inventors: Gerrit Rademaker; Rob Westdorp; Hendrikus J. Grutter, all of Hilversum, Netherlands

[73] Assignee: U.S. Philips Corporation, New York, N.Y.

[21] Appl. No.: 891,307

[22] Filed: May 29, 1992

[30] Foreign Application Priority Data

Jun. 6, 1991 [EP]  European Pat. Off. ........ 91201396.8

[51] Int. Cl.$^5$ .............................................. H04M 1/00
[52] U.S. Cl. ...................................... 379/401; 379/400; 379/412; 379/413; 379/324; 379/398; 379/399
[58] Field of Search ............... 379/401, 400, 412, 413, 379/398, 399, 324

[56] References Cited

U.S. PATENT DOCUMENTS

| | | | |
|---|---|---|---|
| 4,167,654 | 9/1979 | Bolus et al. | 379/412 |
| 4,716,358 | 12/1987 | Fucito | 379/413 |
| 4,723,280 | 2/1988 | Meier | 379/413 |
| 4,764,956 | 8/1988 | Rosch et al. | 379/412 |
| 5,050,210 | 9/1991 | Dillon et al. | 379/399 |

*Primary Examiner*—James L. Dwyer
*Assistant Examiner*—Jacques M. Saint-Surin
*Attorney, Agent, or Firm*—Leroy Eason

[57] ABSTRACT

A supply circuit for a two-wire telecommunication line includes a voltage adjusting circuit section coupled between one of the wires and a first reference potential point and further includes a current source coupled between the second wire and a second reference potential point. A transistor in the voltage adjusting circuit section has a first main electrode coupled to the first wire, a second main electrode coupled to the first reference potential point, and a control electrode which is coupled to the first wire by way of a capacitor. In order for the supply circuit to meet strict requirements as to symmetry and demodulation, the control electrode is also coupled to the first reference potential point by way of a threshold voltage diode, which may be a zener diode. A voltage control circuit coupled to the threshold voltage diode forms a feedback loop for maintaining the line voltage at a selected value despite the presence of disturbing signals on the line.

6 Claims, 1 Drawing Sheet

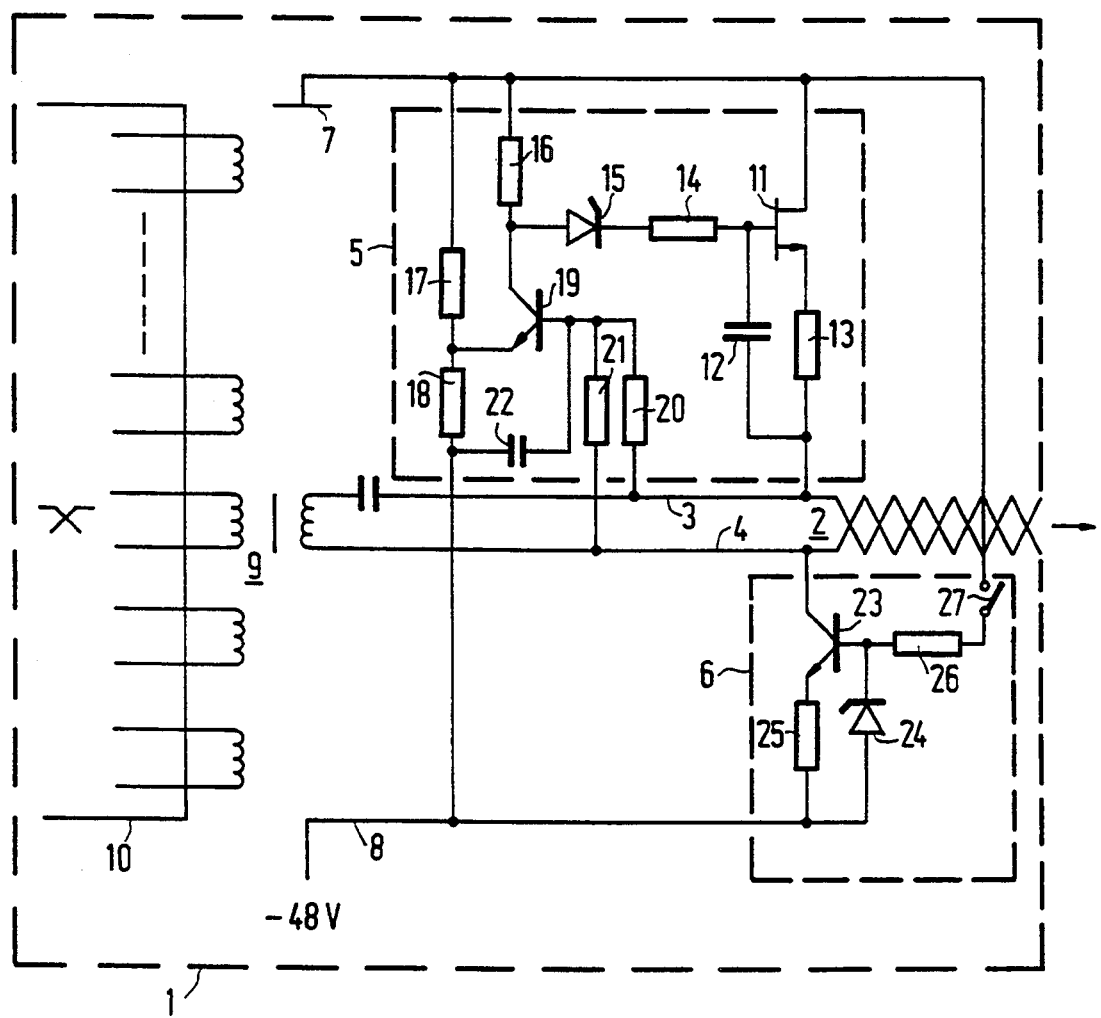

SUPPLY CIRCUIT FOR A TELECOMMUNICATION LINE, PROVIDING HIGHLY SYMMETRICAL AND RAPID RESPONSE TO LINE VOLTAGE DISTURBANCES

BACKGROUND OF THE INVENTION

1. Field of the Invention

The invention relates to a telecommunication system comprising a supply circuit for a two-wire telecommunication line, the supply circuit comprising a voltage adjusting circuit section coupled between a first reference potential point and the first wire, and further comprising a current source coupled between the second wire and a second reference potential point. The voltage adjusting circuit section includes a transistor having a first electrode coupled to the first wire, a second main electrode coupled to the first reference potential point, and a control electrode coupled to one of the reference potential points and, by way of a capacitor, to the first wire.

2. Description of the Related Art

A telecommunication system of this type is widely used as a telephone exchange. Such a telephone exchange is connected to users by means of telecommunication lines comprising each a first and a second wire. During a user's conversation the associated telecommunication line is to be fed with DC current. This was previously effected by way of large coupled coils, but these coils have now been replaced by an electronic supply circuit. Such a supply circuit comprises a voltage adjusting circuit section coupled between a first reference potential point (usually ground) and the first wire of the line. The supply circuit further includes a current source coupled between the second wire of the line and a second reference potential point (usually −48 volts). The voltage adjusting circuit section comprises a transistor having a very high control input impedance, such as a MOSFET (for example of the N-channel type), although a double bipolar Darlington combination could be used as well. The first main electrode of the MOSFET, the source, is usually coupled to the first wire by way of a source resistor, whereas the second main electrode, the drain, is directly connected to ground. The control electrode, the gate, is coupled to the first wire by way of a capacitor and also usually coupled to ground by way of a gate resistor. The current source generally comprises a bipolar transistor (for example, of the n-p-n type), whose emitter and base are coupled to the −48 reference point by way of an emitter resistor and a zener diode respectively, and whose collector is connected to the second wire. The base is further coupled to ground by way of a series combination of a base resistor and a switch.

When a conversation is to take place, the switch is closed and a DC current starts flowing through the current source. This DC current may be adjusted to 30 mA DC by means of a specific selection of the components of the current source, and is supplied to the current source by the voltage adjusting circuit section. This takes place through both wires, which are mutually coupled and have a DC current impedance of about 600 Ohms. Since the capacitor is discharged at the moment the switch closes, the MOSFET is not conductive and in the first instance only a current much smaller than the adjusted 30 mADC current will flow from ground, through the gate resistor, the capacitor, the two wires, the bipolar transistor and the emitter resistor to the −48V reference point. Since the current source is passing much less than the adjusted 30 mADC current, the voltage across the current source is very low and so the voltage of the two wires (the line voltage) in the first instance is in the neighbourhood of the −48V reference potential. The capacitor is slowly charged by this small current until the voltage across the capacitor has increased sufficiently to render the MOSFET conductive. Because the main current path of the MOSFET then passes the adjusted 30 mADC current, the voltage across the current source will rise and the line voltage will increase to a value between the two reference potentials. The final value thus reached by the line voltage lies in the neighbourhood of the potential (ground) at the first reference potential point.

Such a prior-art supply circuit must meet strict requirements as to symmetry and demodulation, as is true of any telecommunication line supply circuit. The strict symmetry requirements are imposed in order to avoid low-frequency common mode disturbance signals from becoming audible. The strict demodulation requirements are imposed in order to avoid a high-frequency modulated common mode disturbance signal from becoming demodulated as a result of non-linear signal processing, and thus becoming audible in the case of insufficient symmetry. In the case of sufficient symmetry both requirements will be met. The described supply circuit will meet these requirements if the impedance of the series combination of the gate resistor and capacitor located between the ground first reference potential point and the first wire is made sufficiently large. In that case, however, there is the disadvantage that the time constant formed by such combination also increases likewise; so that the supply circuit will have a slower adjustment behaviour. This is undesired.

SUMMARY OF THE INVENTION

It is an object of the invention to provide a telecommunication system of the type mentioned in the opening paragraph, in which the supply circuit meets strict requirements as to symmetry and demodulation and also adjusts itself sufficiently fast to changes caused by disturbing signals.

For this purpose, the telecommunication system according to the invention is characterized in that the voltage adjusting circuit section comprises voltage threshold circuit means which conducts in a first direction at the occurrence of a first threshold voltage, thereby rendering the transistor conductive, which voltage threshold circuit means is located between the control electrode of the transistor and the first reference potential.

By including the voltage threshold circuit means between the first reference potential point and the resistor which is connected to the gate of the MOSFET, such voltage threshold circuit means being for example a diode, the capacitor will be charged sufficiently fast via the gate resistor until the voltage across the capacitor has reached a value at which the MOSFET becomes conductive. At that moment the total current flowing through the diode, which is equal to the sum of the leakage current through the capacitor and the gate current, becomes so small that the impedance of the diode increases strongly. As a result, the impedance of the series combination of the diode, gate resistor and capacitor is then sufficiently large so that the requirements as to symmetry are met without the resistance of the gate resistor having to be increased, thereby avoiding reduction of the adjustment speed of the supply circuit.

The use of such a diode is additionally advantageous in that the voltage on the gate of the MOSFET may actually increase above the ground potential available at the first reference potential point. This will likewise increase the voltage on the source of the MOSFET and so increases the voltage available to the line.

In a first embodiment the telecommunication system according to the invention is characterized in that the voltage threshold circuit means is further adapted to conduct in a second opposite direction if a second threshold voltage is present.

If such a voltage threshold circuit means is used, for example, a zener diode or an antiparallel circuit constituted by one forward diode and two or more series-arranged reverse diodes, it is likewise possible for a current to flow in the opposite direction to drain, for example, a high-voltage pulse on the line to ground, or to discharge the capacitor, which may sometimes be desirable. Even when such a zener diode is used, the voltage on the gate of the MOSFET may increase to a value situated above the potential available at the ground reference potential point, so that the voltage available for the line is increased.

In a second embodiment the telecommunication system according to the invention is characterized in that the voltage adjusting circuit section adjusts the telecommunication line voltage to a predetermined value situated between the potentials available at the two reference potential points, the voltage adjusting circuit section being coupled to the control electrode and to at least one of the wires.

When the line voltage is adjusted to a predetermined value by the voltage adjusting circuit section, which value lies between the two reference potentials, the final value reached by the line voltage is no longer defined. If the voltage adjusting circuit section adjusts line voltage, for example, to midway between the two potentials (−24 volts), the range for a voltage excursion in a positive sense (in the direction of such circuit) is about equal to the range for a voltage excursion in a negative sense (in the direction of the current source). This maximum voltage excursion range in either direction (in either direction about 20 volts, depending on the length of the line) is favourable because a high-frequency modulated common mode disturbance signal on the line is not audible as long as its amplitude is smaller than the range for this voltage excursion. Non-linear signal processing and thus demodulation does not take place until the amplitude exceeds such voltage excursion range and the high-frequency disturbance signal on the line is processed non-linearly, for example, by one of the transistors.

In a third embodiment the telecommunication system according to the invention is characterized in that the voltage adjusting circuit section comprises a voltage divider coupled between the two reference potential points, an output of which voltage divider is coupled to one side of a voltage threshold zener diode and also coupled to at least one wire of the line by way of a high-ohmic resistor, the value of which high-ohmic resistor exceeds the characteristic impedance of the line, said side of the zener diode being coupled to the ground reference potential point by way of a further resistor. The high-ohmic resistor is to avoid that the overall impedance of the line starts to deviate too much from its characteristic impedance. Furthermore, since the zener diode is coupled to the ground reference potential point by way of a further resistor, a feedback path is established in the voltage adjusting circuit. In practice the coupling between the output of the voltage divider, the zener diode and the wires is realised by way of a bipolar transistor. Its collector is then connected to the anode of the zener diode and to the further resistor, its base is coupled to the first wire via a first high-ohmic resistor and to the second wire via a second high-ohmic resistor and its emitter is connected to the output of the voltage divider. Needless to observe that this coupling may also be established by means of a more complex differential circuit.

The operation of the voltage adjusting circuit is as follows. Since the voltage divider has two series-connected identical resistors, the voltage at the output is situated midway between the two potentials (−24 volts) of the reference potential points. As long as the line voltage (the average of the voltages on the wires) has about the same value, the voltage adjusting circuit is in a state of rest. If the line voltage increases, so does the base voltage of the bipolar transistor by way of the high-ohmic resistor, so that the current through this transistor increases and the collector voltage decreases. Consequently, the voltage across the zener diode and the capacitor drops, thereby decreasing the line voltage until it is again situated midway between the two reference potentials and the voltage adjusting circuit regains its state of rest. If the line voltage drops, so does the current flowing through the transistor and so the collector voltage rises. As a result, the voltage across the zener diode and the capacitor increases, thereby increasing the line voltage until it is again midway between the two reference potentials and the voltage adjusting circuit regains its state of rest.

In a fourth embodiment the telecommunication system according to the invention is characterized in that the high-ohmic resistor is coupled to one of the reference potential points by way of a smoothing capacitor. This smooths common mode voltages present on the line with the exception of very low frequency common mode voltages having a frequency below 300 HZ, which, however, in telecommunication circuits falls short of the audible frequency band (300–3400 Hz). If common mode voltages having a frequency exceeding 300 Hz were not smoothed, they would appear on the base of the transistor of the voltage adjusting circuit section and thus appear amplified and inverted on the collector of the transistor, so that the impedance of the gate resistor would apparently be reduced and thus the impedance of the supply circuit would apparently be reduced for such frequencies, which is undesirable.

The invention further relates to a supply circuit for a two-wire telecommunication line suitable for use in a telecommunication system of the type mentioned in the opening paragraph, this supply circuit comprising a voltage adjusting circuit section coupled to a first reference potential point, and to a first wire, and also comprising a current source coupled to a second reference potential point and to the second wire. The voltage supply circuit section comprises a transistor a first main electrode of which is coupled to the first wire, a second main electrode of which is coupled to the first reference potential point, and a control electrode of which is coupled to the first wire by way of a capacitor and is further coupled to one of the reference potential points.

It is a further object of the invention that such supply circuit meets strict symmetry and demodulation requirements and, an addition, adjusts sufficiently fast to compensate for line voltage disturbances.

For this purpose the supply circuit according to the invention is characterized in that it comprises voltage threshold circuit means arranged for conducting in a first direction when a first threshold voltage occurs, thus rendering the transistor conductive, which voltage threshold circuit means is located between the control electrode of the transistor and the first reference potential point.

In a first embodiment of said supply circuit the voltage threshold circuit means is adapted to conduct in the reverse direction when a second threshold voltage occurs.

In a second embodiment of said supply circuit the voltage adjusting circuit section comprises a voltage control circuit for adjusting the telecommunication line voltage to a predetermined value situated between the two reference potentials, this voltage control circuit being coupled to the voltage threshold circuit means and to at least one of the wires.

In a third embodiment of said supply circuit the voltage control circuit comprises a voltage divider between the two reference potential points, an output of which voltage divider is coupled to one side of the voltage threshold circuit means and to at least one of the wires by a high-ohmic resistor, the resistance of which high-ohmic resistor exceeds the characteristic impedance of the telecommunication line, the one side of the voltage threshold circuit means being coupled to the first reference potential point by way of a further resistor.

In a fourth embodiment of said supply circuit the high-ohmic resistor is coupled to one of the reference potential points by way of a smoothing capacitor.

BRIEF DESCRIPTION OF THE DRAWINGS

The invention will be further explained with reference to an embodiment thereof represented in the sole drawing FIGURE, showing a telecommunication system according to the invention comprising a supply circuit for a telecommunication line.

DESCRIPTION OF THE PREFERRED EMBODIMENT

The telecommunication system 1 in FIG. 1 comprises a supply circuit for a telecommunication line 2 which has a first wire 3 and a second wire 4, these wires 3, 4 being intertwisted. The supply circuit includes a voltage adjusting circuit section 5 and a current source 6. The circuit section 5 is coupled between the first wire 3 and a first reference potential point 7 which corresponds to ground. The current source 6 is coupled between the second wire 4 and a second reference potential 8 which corresponds to −48 volts. One side of the line 2 is connectable to a subscriber set (not shown), the other side being capacitively coupled to a secondary winding of transformer 9. The primary winding of this transformer 9 is connected to a coupling field 10 which is capable of interconnecting various subscribers or connecting them to an external line.

The circuit section 5 comprises an N-channel MOSFET transistor 11 whose drain is connected to the ground potential reference point 7. The source of MOSFET transistor 11 is coupled to the first wire 3 by way of a source resistor 13 and the gate is coupled to the first wire 3 by way of a capacitor 12. The gate is also coupled to ground potential reference point 7 by way of the series combination of a gate resistor 14, a voltage threshold circuit means constituted by a zener diode 15, and a further resistor 16. In addition, the circuit section 5 comprises a voltage control circuit formed by a voltage divider constituted by two series-arranged resistors 17, 18, two high-ohmic resistors 20, 21, a bipolar transistor 19 and a smoothing capacitor 22. The two series-arranged resistors 17, 18 are coupled between the ground reference potential point 7 and the second reference potential point 8 corresponding to −48 volts. An output of this voltage divider is connected to the emitter of transistor 19. The base of transistor 19 is coupled to the first wire 3 by way of high-ohmic resistor 20, to the second wire 4 by way of the high-ohmic resistor 21, and to the −48 v reference point by way of the smoothing capacitor 22. The collector of transistor 19 is connected to the junction of the zener diode 15 and the further resistor 16. The two high-ohmic resistors 20, 21 each have a resistance exceeding the characteristic impedance of the telecommunication line 2, which characteristic impedance is about 600 Ohms.

The current source 6 comprises a bipolar transistor 23 whose collector is connected to the second wire 4. By way of an emitter resistor 25 the emitter of transistor 23 is coupled to the −48v reference point 8, and the base is also coupled to the −48 v reference point 8 by way of a zener diode 24 and to the ground reference point 7 by way of the series combination of a base resistor 26 and a switch 27. The switch 27 is controlled by the coupling field 10 so it is closed during a telephone conversation taking place over the telecommunication line 2.

The operation of the supply circuit of the telecommunication system 1 in FIG. 1 is as follows. When a conversation is to take place, switch 27 is closed by the coupling field 10, and a current starts flowing from ground, through base resistor 26, base-emitter junction of transistor 23 and via emitter resistor 25 to −48 volts. Because capacitor 12 is discharged in the first instance, MOSFET 11 is not conductive and so only a small current of the order of the charging current through capacitor 12 will flow through the collector emitter junction of transistor 23. This current is considerably smaller than the current that would flow through such junction and the emitter resistor 25 on the basis of the resistance of such resistor and the breakdown voltage of zener diode 24. The current through emitter resistor 25 is not increased by a large base current either, because the base current is limited by the relatively high resistance base resistor 26. Because of the limited current flowing through emitter resistor 25, the voltage across it is also limited and the voltage across zener diode 24 is smaller than the breakdown voltage. This remains the case as long as the voltage across the charging capacitor 12 is too small to render MOSFET 11 conductive, so that no more than the charging current of capacitor 12 flows through the collector-emitter junction of transistor 23. The voltage on line 2 is very near to −48 volts during the period of time in which MOSFET 11 is not conductive.

In this manner, capacitor 12 is charged via further resistor 16, zener diode 15, gate resistor 14 and current source 6. Once the voltage across capacitor 12 has reached a sufficient value, MOSFET 11 is rendered conductive and a current starts flowing from ground through the drain-source junction of MOSFET 11, source resistor 13, the collector-emitter junction of transistor 23, and emitter resistor 25 to −48 volts. The current source 6 is dimensioned so that the final value of this current is about 30 mA, the voltage across zener diode 24 then being approximately equal to the breakdown voltage of zener diode 24.

The voltage on line 2 then rises to a value defined by the voltage adjusting circuit 5. The voltage at the output of the voltage divider formed by the two series-arranged resistors 17, 18, is about 24 volts, and is present at the emitter of transistor 19. A substantially equal voltage therefore occurs at the base of transistor 19, and also on the wires 3, 4 via the high-ohmic resistors 20, 21.

If the voltage on line 2 increases or decreases due to a disturbance signal, the voltage on the base of transistor 19 will also increase or decrease and the current through further resistor 16 will likewise increase or decrease. As a result, the voltage at the junction between further resistor 16 and zener diode 15 will increase or decrease, causing the voltage on line 2 to decrease or increase via zener diode 15, gate resistor 14 and capacitor 12. In this manner a feedback is realised by which the voltage on the line is returned to about −24 volts after a disturbance. Smoothing capacitor 22 filters any common mode disturbing voltages available on the line, which otherwise would be amplified by transistor 19 and end up in an inverted version on its collector, where they could lead to an apparent impedance reduction of the gate resistor 14. This filtering is effected for common mode disturbing signals having a frequency exceeding 300 Hz, because an apparent impedance reduction caused by disturbing signals with a lower frequency entails few disadvantages.

The supply circuit according to the invention meets the strict requirements of symmetry imposed on such a supply circuit, due to the presence of the zener diode 15. Without the presence of zener diode 15, the relatively low resistive/capacitive impedance formed by the series combination of the further resistor 16, gate resistor 14 and capacitor 12 would have to be compensated by providing a resistive/inductive impedance between the wire 4 and point 8 (−48 volts). By adding zener diode 15 to the series combination the impedance of such combination is increased to such an extent that compensation is no longer necessary. This can be explained as follows. When the voltage across capacitor 12 has attained a value at which MOSFET 11 becomes conductive, no more than a small leakage current flows through capacitor 12. From then on the total current flowing through the zener diode 15 is equal to the sum of this leakage current and the gate current through MOSFET 11 and thus so small as to render the impedance of the zener diode 15 very large. Consequently, the impedance of the whole series combination is also very large and compensation is no longer necessary.

In lieu of MOSFET 11, a bipolar transistor could be used whose base current is of the same order of magnitude as the leakage current of capacitor 12. A bipolar transistor having such a small base current could be realised, for example, by means of a double Darlington configuration. A single Darlington configuration would have too large a base current, causing too large a current to flow through zener diode 15 when the capacitor 12 is fully charged, so that the diode impedance would be too small and the symmetry requirements would no longer be satisfied.

In lieu of zener diode 15, an ordinary diode could be used whose anode is connected to further resistor 16 and whose cathode is connected to gate resistor 14. However, a disadvantage then occurs which will be discussed hereinafter. It is possible indeed, without creating any further disadvantages, to substitute an antiparallel combination of one forward diode or two or more series-arranged reverse diodes for zener diode 15, the anode of the forward diode then being connected to the further resistor 16 and the cathode to gate resistor 14. The two or more series-arranged diodes in this case determine the breakdown voltage of the equivalent zener diode realised in this fashion.

The function of the control circuit constituted by the resistors 17, 18, the bipolar transistor 19, the high-ohmic resistors 20, 21 and the smoothing capacitor 22 may also be realised in other ways, for example, by using a more complex differential circuit. As long as the coupling to the wires 3, 4 is effected via the high-ohmic resistors 20, 21, the value of which being, for example, at least 100 times greater than the characteristic impedance of the line 2, the supply circuit will not disturb the characteristic impedance of the line. The control circuit adjusts the value of the line voltage midway between the two potentials (−24 volts), so that the voltage excursion range in a positive sense (in the direction of the circuit 5) becomes about equal to the voltage excursion range in a negative sense (in the direction of the current source). This maximum voltage excursion range in the two directions (about 20 volts in either direction) is favourable because a high-frequency modulated common mode disturbance signal on line 2 does not become audible as long as its amplitude is smaller than this voltage excursion range. Non-linear signal processing and thus demodulation is not effected until the amplitude exceeds such voltage excursion range and the high-frequency disturbance signal on the line 2 is processed non-linearly by, for example, one of the transistors. By means of the control circuit the supply circuit satisfies the demodulation requirements imposed on such a supply circuit.

The above-mentioned disadvantage which would occur if the zener diode 15 were replaced by an ordinary diode becomes clearly apparent when the described voltage control circuit is used. If the voltage on line 2 (the average of the voltages on the wires 3, 4) rises due to a disturbance signal, the voltage on the cathode of diode 15 will rise via the capacitor 12. At the same time the voltage on the base of bipolar transistor 19 will rise and so will the main current flowing through this transistor 19 and hence the current flowing through further resistor 16, which leads to a reduction of the voltage on the anode of the diode. The diode would therefore be rendered non-conductive when the line voltage rises, which would detrimentally affect the control process. If a zener diode 15 is used, this obviously cannot occur.

The use of zener diode 15 is furthermore advantageous in that the gate of MOSFET 11 may be further controlled even up to a voltage value exceeding the ground potential at point 7. Consequently, the voltage loss across the gate-source junction and the source resistor 13 is compensated and in this manner there is a voltage excursion range in a positive sense (in the direction of circuit 5) which satisfies the demodulation requirements. Naturally, the same holds if zener diode 15 were replaced by an ordinary diode.

The breakdown voltage (20 volts) of zener diode 15 is preferably selected somewhat smaller than half the minimum voltage difference between the two reference points 7, 8 (42 volts). If the breakdown voltage were greater than this, worst case situations would be possible in which the control process would be detrimentally affected by the too large breakdown voltage. If the selected breakdown voltage were much smaller, common mode disturbing signals having a relatively small amplitude and which are available on line 2 would be demodulated by the non-linear signal processing of the zener diode 15, which is undesirable.

We claim:

1. A supply circuit for a two-wire telecommunication line, said supply circuit comprising a voltage adjusting circuit section coupled between a first wire of said line and a first reference potential point, and a current source coupled between a second wire of said line and a second reference potential point; said voltage adjusting circuit section comprising:

transistor having a control electrode, a first main electrode coupled to said first wire, and a second main electrode coupled to said first reference potential point;

a capacitor coupling said control electrode to said first wire; and means including a threshold voltage diode for further coupling said control electrode to said first reference potential point, said threshold voltage diode becoming conductive in a forward direction when the voltage there-across reaches a first threshold level, thereby charging said capacitor so as to produce a voltage at said control electrode which renders said transistor conductive.

2. A supply circuit as claimed in claim 1, wherein said threshold voltage diode also becomes conductive in a reverse direction when the voltage there-across reaches a second threshold level in a direction opposite to said first threshold level.

3. A supply circuit as claimed in claim 2, wherein said voltage adjusting circuit section further comprises a voltage control circuit coupled to said line and to said threshold voltage diode for establishing a feedback loop which maintains the voltage of said communication line at a selected level between said first and second reference potentials.

4. A supply circuit as claimed in claim 3, wherein said voltage control circuit comprises: a voltage divider coupled between said first and second reference potential points; and coupling means for coupling an output of said voltage divider to said threshold voltage diode and to one of said wires by way of a high-ohmic resistor, said high ohmic resistor having a resistance exceeding a characteristic impedance of said line; and wherein said threshold voltage diode is coupled to said first reference potential point by way of a further resistor.

5. A supply circuit as claimed in claim 4, wherein said high-ohmic resistor is coupled to said one of said wires by way of a smoothing capacitor.

6. A supply circuit as claimed in claim 2, wherein said threshold voltage diode is a zener diode.

* * * * *